Jan. 9, 1940.  G. E. SAUSSURE  2,186,657
VALVE
Filed March 22, 1938  2 Sheets-Sheet 1
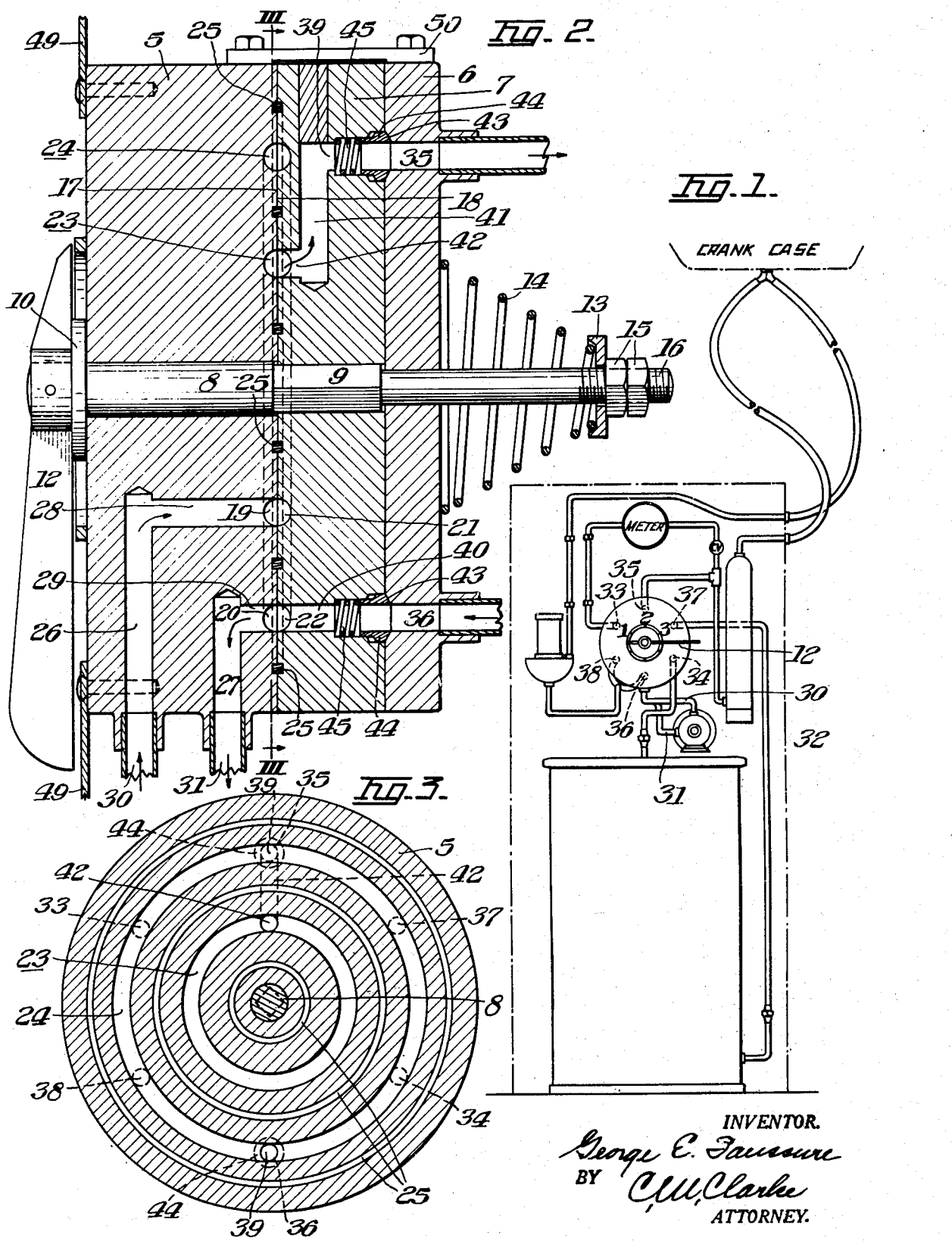
INVENTOR.
George E. Saussure
BY C. M. Clarke
ATTORNEY.

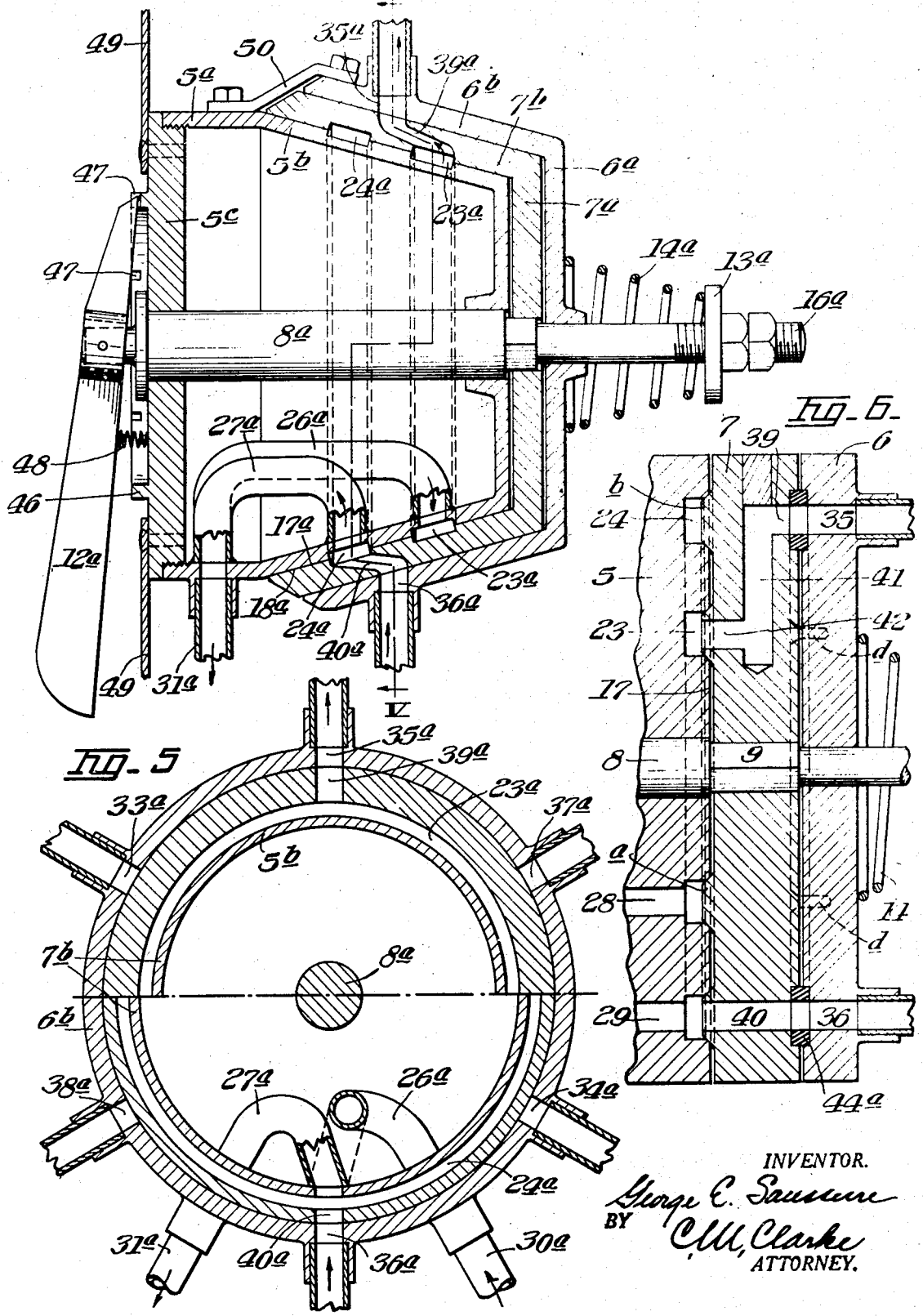

Patented Jan. 9, 1940

2,186,657

UNITED STATES PATENT OFFICE 2,186,657

VALVE

George E. Saussure, Pittsburgh, Pa.

Application March 22, 1938, Serial No. 197,429

4 Claims. (Cl. 251—87)

This invention relates to improvements in valves or control devices of the character adapted for selective fluid distribution to a plurality of associated utilizing means.

For example, valves of the character stated may be employed with a pump in apparatus for cleaning engine crank cases and the like, wherein the valve is adjusted to selectively connect the pump in fluid circulation with a plurality of conduits having to do with the flow of the cleansing fluid in relation to the crank case, etc.

I contemplate providing a valve of simple and inexpensive construction which may be readily applied to a multiple circuit fluid system for circulation control through simple adjustment of the valve.

The invention further has in view the provision of internal annular supply and return means embodying a pair of movable channels or ports for selectively establishing fluid communication between the supply and return means and a pair or plurality of pairs of distribution means, whereby the valve is readily applicable to the purposes above stated.

Additional objects and advantages of my invention will become apparent from the following description taken in connection with the accompanying drawings, wherein:

Fig. 1 is a diagrammatic elevational view showing an application of my invention;

Fig. 2 is an enlarged sectional view showing one embodiment of the valve of my invention;

Fig. 3 is a reduced cross-section taken on line III—III of Fig. 2;

Fig. 4 is a view similar to Fig. 2, showing a modification;

Fig. 5 is a cross-section taken on the broken line V—V of Fig. 4; and

Fig. 6 is a partial sectional view similar to Fig. 2, showing a further modification.

Referring to the drawings, and more particularly to the form of my invention illustrated in Figs. 2 and 3, the valve generally consists of a body portion including front and rear stationary members or disks 5 and 6 respectively, and a separate intermediate rotatable member or disk 7. While the members 5 and 6 are shown and are preferred as separate members for purposes of manufacture and assembly, it is intended that they may be embodied in a single stationary member if desired.

8 designates an operating shaft or stem extending centrally through said members, said stem being rotatably mounted in members 5 and 6, and having engagement by key section 9 with the movable member 7 for rotating the same between and relatively to said stationary members.

At the front of the valve, the stem 8 is shouldered as at 10 for engagement with the member 5, and is provided with an operating handle or arm 12 secured thereto as by a pin or key.

A reduced rear portion of the stem 8 projects through and beyond the member 6, and has an abutment washer 13 for a conical spring 14. Said spring bears against the rear face of member 6 and is adjustable through movement of the washer by nuts 15 on the rear terminal threaded portion 16 of the stem, for proper bearing pressure to retain the members 5, 6 and 7 in proper contact, while permitting rotation of the said member 7.

Front member 5 and the rotatable member 7 are each provided with flat bearing faces 17 and 18 respectively, which faces extend normally to the axis of rotation of the valve. Formed in the face 17 of member 5 are a pair of concentric open grooves 19 and 20. Similarly, the face 18 of member 7 is formed with a complemental pair of open concentric grooves 21 and 22, said concentric grooves in the members registering to form a pair of completely annular concentric fluid supply passages 23 and 24.

25 designates a plurality of spaced concentric sealing or packing rings annularly seating in both faces 17 and 18 of the members 5 and 7, located for preventing leakage outwardly of the valve as well as preventing by-passing flow between the passages 23 and 24.

The front member 5 is further provided with a pair of fluid passages 26 and 27 extending radially inward from the periphery of said member. One of said passages, as for example, passage 26, communicates with annular fluid passage 23 by a passage 28, and passage 27 communicates with the other annular passage 24 by a passage 29. Passages 26 and 27 are adapted for connection, as by conduits 30 and 31, with a fluid pump or the like 32, as in Fig. 1, said conduits 30 and 31 being connected with the discharge and inlet sides of the pump respectively.

Rear valve member or disk 6 is formed with an annular series of through ports or distributing passages arranged in diametric pairs, as in Fig. 3, said pairs of ports being designated 33—34, 35—36, and 37—38 respectively.

For establishing fluid communication between the ports of member 6 and the passages of member 5, I provide the rotatable member 7 with a single diametric pair of passages 39 and 40, which passages are disposed to be rotated by member 7 in an annular path coincident with the said annular series of ports in member 6.

Passage 40 extends through the member 7 for communication with annular passage 24, and passage 39 communicates with annular passage 23 through connecting passages 41 and 42.

Suitable means are provided for sealing the communication between passages 39—40 and the series of ports in member 6. For example, the said ports in member 6 may be formed with surrounding seats 43 in the plane of the contacting faces of members 6 and 7, and passages 39 and 40 may be provided with reciprocable valves or sealing bushings 44 having springs 45 for normally urging said bushings into contact with the seats 43 upon the passages 39—40 coming into register with any of the diametric pairs of ports in valve member 6.

Spring-actuated bushings 44 also function to determine and retain the register of passages 39—40 of rotatable member 7 with a selected pair of ports in the member 6.

It is therefore seen that upon rotation of the member 7 by handle 12 and stem 8, any of the ports in the rear member 6 may be placed in communication with one of the annular passages 23 or 24, and its respective diametrically alined port in said member 6 will be placed in communication with the other of said annular passages.

Hence, in a multiple system whereby it is desired to pass a body of fluid through a plurality of circuits, conduits 30 and 31 being connected with the discharge and inlet sides of a fluid pump respectively, and connecting the pairs of ports 33—34, 35—36 and 37—38 in the desired plural fluid circuits, the valve of my invention will readily establish a circulation of a body of supplied fluid with the pump and that particular circuit connected between any selected pair of ports.

Such a use of the valve of my invention is indicated in Fig. 1, wherein said valve is connected by a plurality of conduits, to a meter, filter, trap, etc. for circulating a flushing oil for cleaning an engine crank case, the same being shown herein merely by way of illustration, since the cleaning apparatus forms no part of the present invention, and is the subject matter of a separate application of even date, Serial No. 197,428.

Attention is called to the fact that my valve is entirely reversible, whereby I am enabled to reverse the connection of ports 26 and 27 with a circuit connecting any of the pairs of ports 33—34, 35—36 or 37—38 merely by rotating the member 7 through 180-degrees. This is of considerable advantage where a reversing circulation of fluid is desired.

Fig. 6 illustrates a modified form of my invention, wherein the pair of annular fluid passages 23 and 24 are formed entirely in the member 5, or more specifically, in the face 17 thereof.

In this form, the contacting face 18 of rotatable member 7 is formed with a pair of concentric projecting annular rib portions *a* and *b* having tapered cross-section for respectively rotating in sealing engagement with the passages 23 and 24.

The rotatable member 7 has passages 39—41—42 and 40 respectively formed therein as before, the passages 42 and 40 opening through the portions *a* and *b* respectively for communication with annular passages 23 and 24.

Fig. 6 also illustrates a modified form of sealing means between the passages of member 7 and the annular series of ports in member 6, consisting of an annular perforate gasket 44a recessed in and secured to member 6 as by screws *d*. The meeting face of member 7 is likewise recessed to receive said gasket, which, under the pressure of spring, prevents leakage of fluid during the operation of the valve.

Figs. 4 and 5 illustrate a modified form of my invention wherein the distribution passages and ports are embodied in a tapered or plug-type valve. In such construction, the valve has three members as before, including front and rear stationary members 5a and 6a respectively, and an intermediate member 7a, the latter being rotatable by a stem 8a. Said members have concentric coniform tapered portions 5b, 6b and 7b respectively, designed to be nested in fitting contact to prevent the escape of fluid therebetween, and are held by a rear spring 14a adjustable for proper tension by washer 13a on the rearward threaded terminal 16a of stem 8a, as before.

23a and 24a designate spaced concentric annular passages formed by complemental grooves in the contacting faces 17a and 18a of members 5a and 7a respectively, or more particularly, in the inclined portions 5b and 7b thereof.

Member 6a is provided with the series of diametric pairs of ports in the portion 6b thereof, said ports being designated 33a—34a, 35a—36a, and 37a—38a, and member 7a has a single pair of diametric ports 39a and 40a respectively extending from annular passages 23a and 24a outwardly for register with the annular series of ports in said member 6a.

The member 5a is preferably hollow and has a pair of conduits 26a and 27a for passage of fluid to and from the passages 23a and 24a respectively, said conduits being connected with outer conduits 30a and 31a for connection with a pump or other means as before.

5c designates a front plate threaded into member 5a, and has an index ring 46 thereon, which ring has a series of radial notches 47 therein for engagement by the operating handle 12a for proper register of passages 39a and 40a with any of the pairs of ports in the member 6a. Handle 12a is pivoted to the stem 8a and has a spring 48 for retaining said handle in the notches of the index ring while permitting disengagement thereof for rotation of the valve.

Both the disk-type and plug-type constructions illustrated herein function in a like manner to effect a selective fluid distribution throughout a multiple circuit system, and are operable under high pressures without leakage.

The location of the pairs of distribution ports in members 6 or 6a in a single plane facilitates construction of the valve, and renders the same readily applicable to a plurality of conduit connections without difficulty as to working space.

Since the said distribution ports are disposed in pairs as stated, no difficulty is encountered in making connections with multiple circuits to provide for proper fluid circulation therein. Likewise, the valve of my invention is unlimited as to the number of pairs of distribution ports, it being only necessary to enlarge the diameter of the valve in accordance with the desired number of ports required so as to maintain a sufficient spacing therebetween.

The valve may be mounted in any suitable manner, as for example, by attaching the front members 5 or 5a to a supporting panel or frame 49. While the plural conduits connected with the members 6 or 6a will maintain said members stationary, suitable external connecting straps 50 may be employed to secure the members 6 or 6a to the members 5 or 5a if desired.

Various changes and modifications are contemplated within the scope of the following claims.

What I claim is:

1. In a valve of the character described, the combination with a pair of spaced stationary members, of a member rotatably disposed between and in contact with said members, means for rotating the rotatable member, a pair of concentric fluid passages in one of the stationary members and a concentric series of pairs of fluid ports in the other stationary member, said rotatable member having a pair of fluid passages in communication with the said annular pairs of passages and disposed for register with any of the pairs of ports upon rotation of the rotatable member, and means associated with said passages in the rotatable member for engaging the selected ports in said stationary member to prevent the escape of fluid and retain said passages and ports in register.

2. A valve comprising a front stationary head having a supply port communicating with an annular channel and a return port communicating with an annular channel concentric therewith, a rear stationary head having a plurality of pairs of supply ports and return ports normally disposed out of communication with said channels, and a rotatable member between the front and rear head having ports adapted to separately connect selected pairs of supply and return ports of the rear head with the supply and return ports of the front head through the respective annular channels thereof, an operating stem keyed to the rotatable member and journaled in each stationary head, a shoulder on the stem abutting one of the heads, said stem projecting outwardly beyond the other stationary head, an expansive spring surrounding the projecting portion of the stem and abutting the latter and adjacent stationary head, and means securing the stationary heads in spaced-apart relation so that the rotatable member will be unaffected by the expansion of said spring.

3. In circulation control means for selective fluid distribution to a plurality of associated utilizing means, the combination with two spaced-apart stationary members each having a valve-engaging face, of a rotatable valve member between said stationary members engaging said faces, annular fluid passages disposed in a plane of engagement of the stationary and rotatable members, each of the annular passages communicating with an independent circulation conduit, one of the stationary members having a plurality of annular pairs of diametrically opposite circulation openings therein, said rotatable member having a pair of diametrically opposite circulating ports in constant register with the said annular grooves, each of said ports of the valve member being adapted upon rotation to register with the circulation openings of either pair in said stationary member, an operating stem journalled in the stationary members and keyed to the valve member, a shoulder on the stem abutting one of the stationary members, said stem projecting beyond the other stationary member, an expansive spring surrounding the projecting portion of the stem and abutting the latter and the adjacent stationary member, and means securing the stationary members in said spaced-apart relation so that the valve member will be unaffected by the expansion of the spring.

4. In circulation control means for selective fluid distribution to a plurality of associated utilizing means, the combination with two outermost spaced-apart stationary heads each having an inner valve-engaging face, one of said heads having on its inner face two annular grooves each communicating with an independent circulation conduit, the other head having a plurality of annular pairs of diametrically opposite circulation openings leading outwardly from and inwardly to its inner face, of a rotatable valve member between said heads having a pair of diametrically opposite circulating ports in constant register with the two annular grooves of the first named head, and an actuating stem for the valve member rotatively mounted in said heads whereby each of the valve member ports may be brought into register with each of the circulation openings of either pair in the other head, an axially slidable operating stem journalled in each stationary head and keyed to the valve member, an index ring on one of the stationary heads having position-indicating notches, an operating part pivoted on said stem and engageable in said notches, a key section on the stem engaging the valve member, said stem projecting outwardly beyond the other stationary head, an expansive spring surrounding the projecting portion of the stem and abutting the stem and the adjacent stationary head, and means securing the stationary heads in said spaced-apart relation so that the valve member will be unaffected by the expansion of said spring.

GEORGE E. SAUSSURE.